United States Patent Office 2,889,962
Patented June 9, 1959

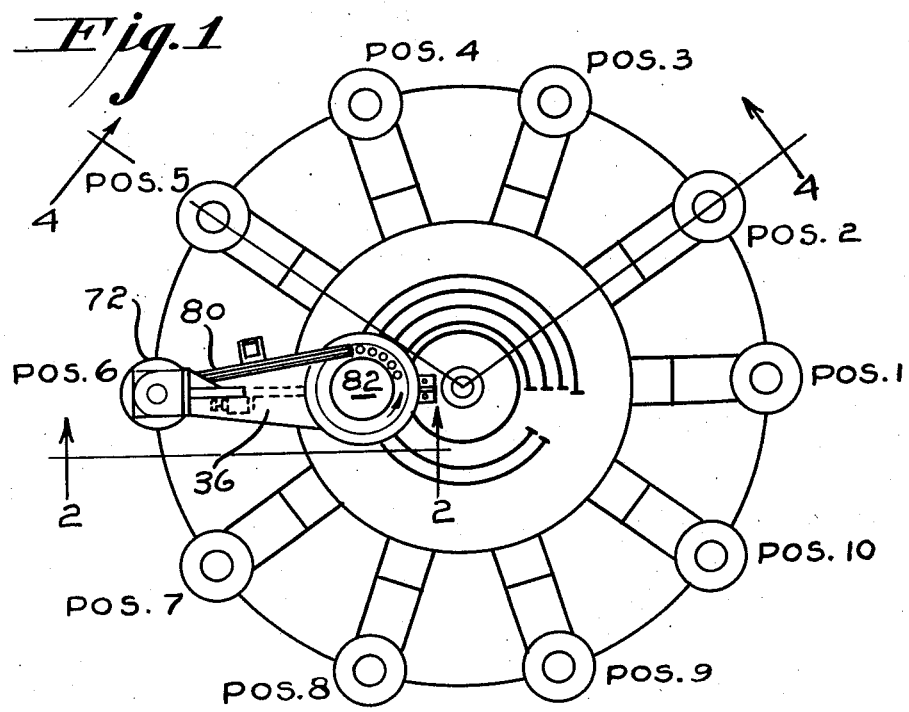
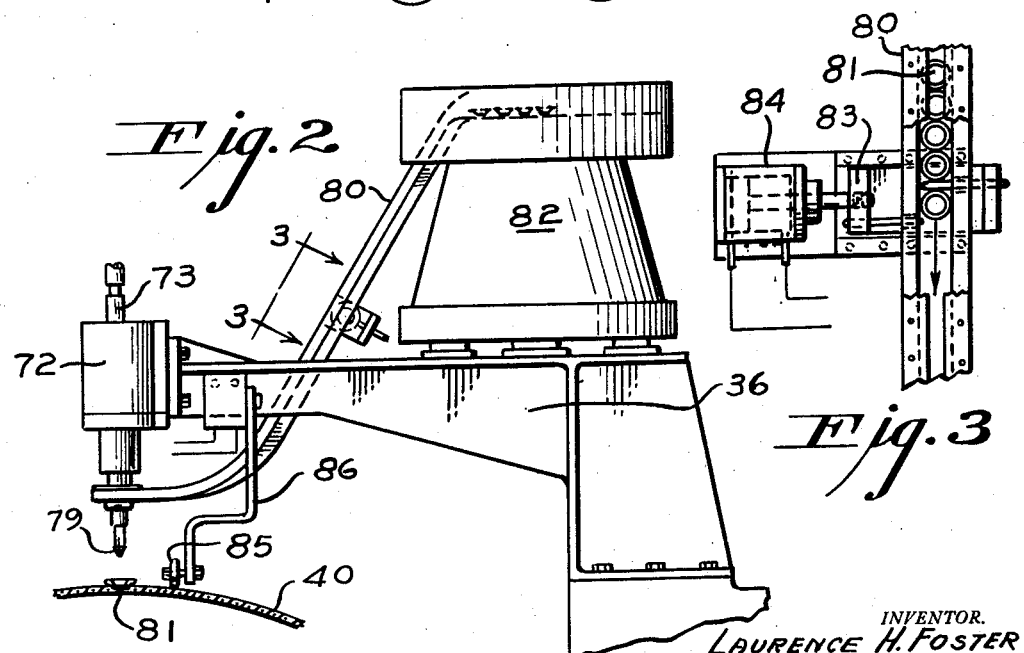

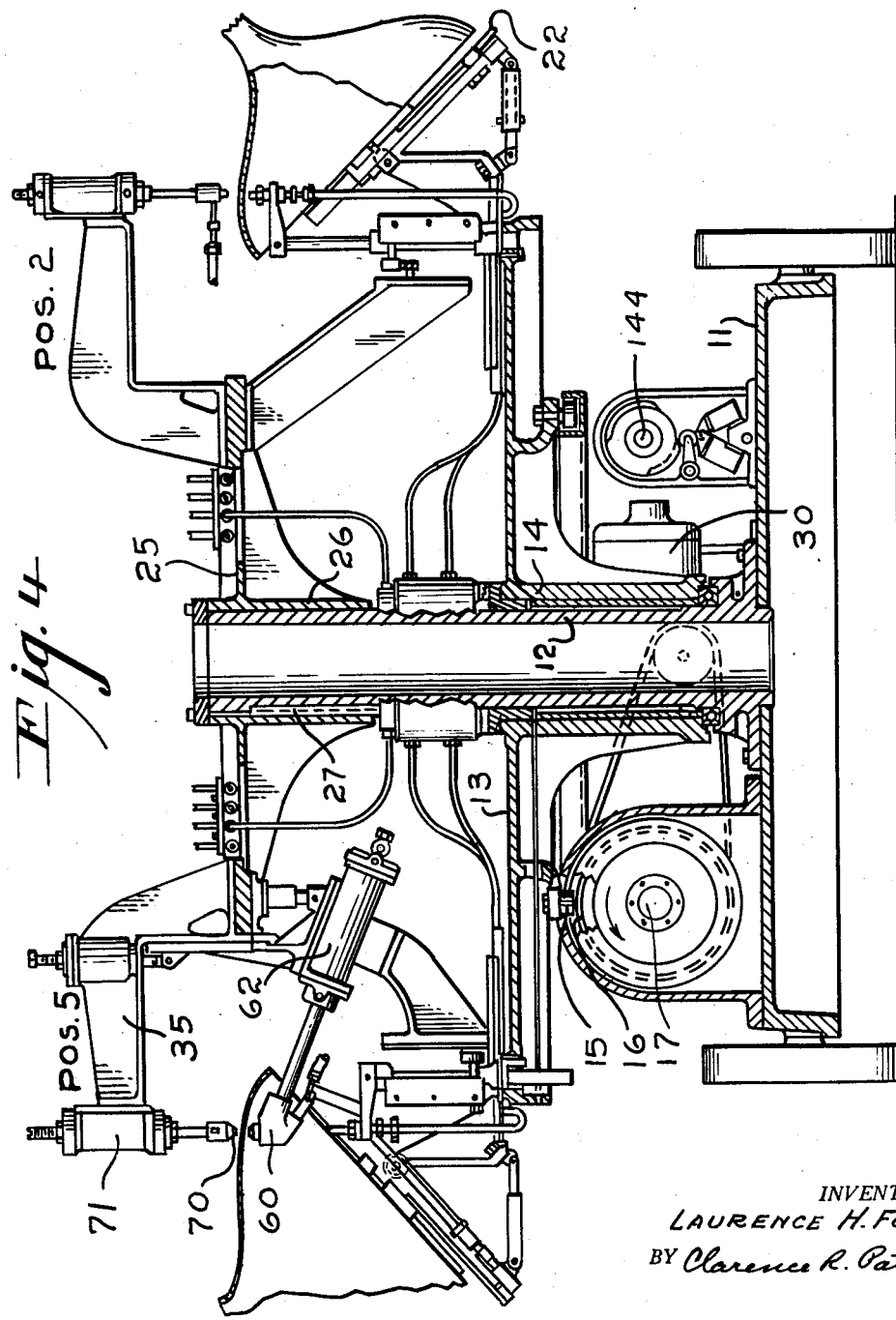

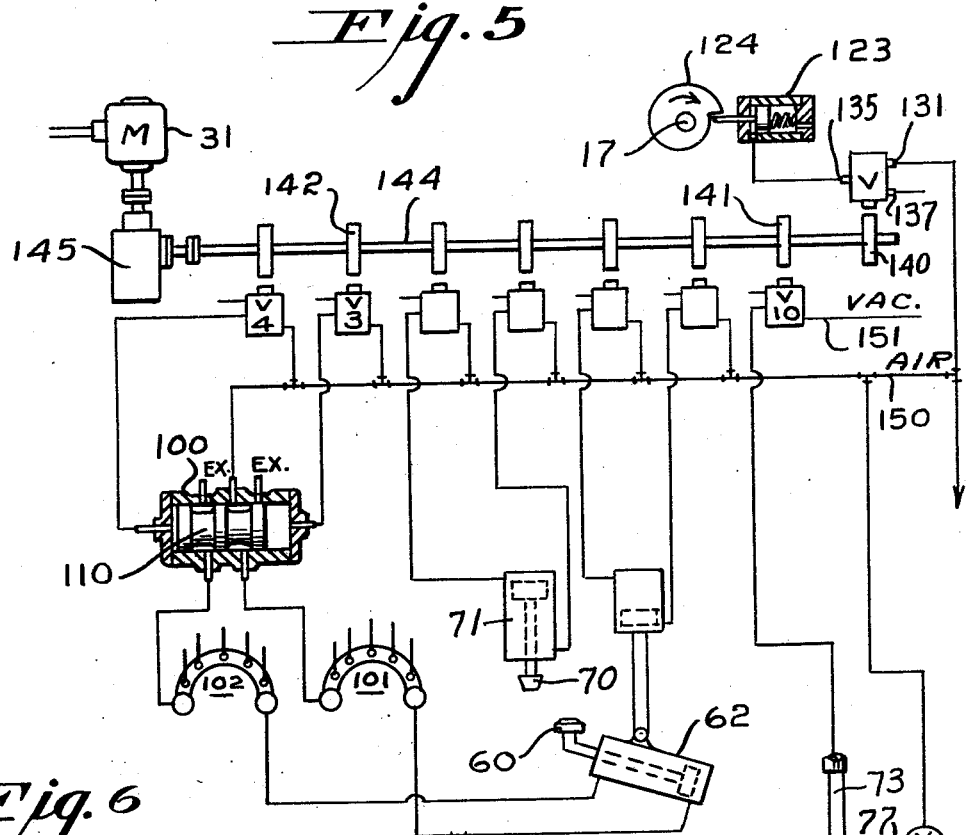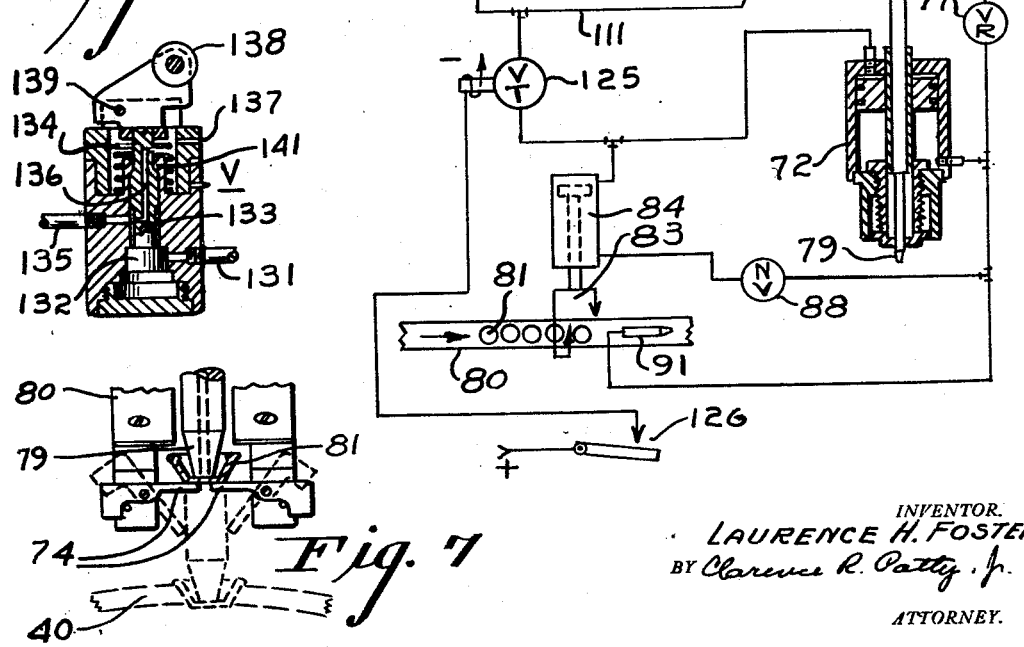

2,889,962

ARTICLE HANDLING

Laurence H. Foster, Corning, N.Y., assignor to Corning Glass Works, Corning, N.Y., a corporation of New York Application October 21, 1954, Serial No. 463,780

3 Claims. (Cl. 221—293)

The present invention relates to article handling, but is particularly concerned with the provision of a simple form of apparatus suitable for use in feeding electrically conductive elements, hereinafter referred to as buttons, to a chuck or holder and for the appropriate control of the holder to effect the deposit of buttons over the apertures of television picture tube envelope parts as such parts are successively indexed thereunder.

The invention may, for example, be applied to machines such as disclosed in Hinkley Patent No. 2,637,942 or such as disclosed in a co-pending Meikle application S. N. 422,070 filed April 9, 1954, now abandoned, and owned by the assignee of the instant application. Each of such disclosures shows a manually fed vacuum chuck adapted to hold a button and to, under control of the machine operation, deposit such button on a picture tube part occupying a chuck therefor indexed under such holder.

According to the present invention a button is automatically positioned for seizure by the holder prior to its travel from a position of rest to a button depositing position. Moreover, the initiation of the travel of the holder from its position of rest is made contingent on the indexing of an article thereunder; thus preventing the delivery of a button when an unoccupied article chuck is indexed at the button depositing position.

A preferred embodiment of the invention, as in the disclosures of Hinkley and Meikle, comprises a machine having loading and unloading positions designated Pos. 1 and Pos. 10 respectively and eight intermediate positions at which various operations are performed on a tube part while indexed at such intermediate positions.

In the accompanying drawings Fig. 1 is a diagrammatic view in plan of a machine embodying the invention.

Fig. 2 is an elevational view of a fragment of the machine taken generally on line 2—2 of Fig. 1, and includes the showing of a fragment of a tube part in section with a button arranged thereon.

Fig. 3 is a fragmentary view taken generally along line 3—3 of Fig. 2.

Fig. 4 is a sectional elevation taken along line 4—4 of Fig. 1.

Fig. 5 is a diagrammatic view showing the timing cam drive arrangement employed in initiating the machine indexing operation and in controlling the actuation of the equipment at indexed positions; and includes a piping diagram of the machine, with certain operating elements included therein shown in section.

Fig. 6 is a sectional view of one of a number of like timing cam actuated valves diagrammatically shown in Fig. 5.

Figure 7 is a fragmentary enlarged view showing the button transferring arrangement.

Referring to the drawings in detail and particularly to Fig. 4, the numeral 11 represents a base provided with a fixed vertical column 12. A turret 13 has a hub 14 rotatable about column 12, and has depending rollers such as 15 by means of which the turret is indexed by a cooperative indexing wheel 16 in a conventional fashion each time shaft 17 supporting such wheel is rotated a single revolution, as by a motor 30.

Arranged on turret 13 are ten chucks, such as 22, adapted to be successively indexed through positions 1 to 10 as labeled in Fig. 1. Any or all positions 2 to 9 may be provided with equipment supported on a spider 25 having a hub 26 surrounding the upper portion of column 12 and locked against relative rotary movement by a key 27. Such equipment may be for the most part similar to that shown in the cited references.

Since the present invention is related solely to facilities for supplying buttons to a button holder and for the control of such holder to effect the deposit of such buttons, the description of the machine and its operation is limited so far as possible to the equipment at the position preceding the button depositing position, and that at the latter position, namely positions 5 and 6. As in the cited references, a position 5 (Figs. 4 and 5) there is provided perforating equipment including a pneumatic unit 62 for advancing a die 60 into vertical alignment with a punch 70 projecting from a pneumatic unit 71 supported on an arm 35 of spider 25.

At position 6 (Figs. 1 and 2), there is a spider arm 36 there is arranged a pneumatic unit 72 provided with a tubular piston rod 73 whose upper end is connectable to a vacuum source 151 (Fig. 5) via a control valve V10 and whose lower end is adapted to serve as a vacuum activatable button chuck or holder 79. For the purpose of supplying buttons to holder 79 there is provided a trough 80 (Figs. 1, 2, 5, and 7) continuously supplied at its upper end with buttons such as 81 in any convenient manner, as from a vibratory feeder 82 (Fig. 2). Normally such buttons are, however, prevented from passing beyond an escapement device or trough gate 83 (Figs. 3 and 5). A pneumatic unit 84 associated with gate 83 is operable to release buttons one at a time for passage to the lower end of the trough as required. The gravitational movement of such buttons may if desired be aided by an air stream from a nozzle such as 91 (Fig. 5). The lower end of trough 80 (see Fig. 7) so terminates beneath the chuck 79 that a button 81 therein is in vertical register with the chuck. Moreover, a button delivered to the lower end of the trough rests on a pair of counter-balanced tray doors 74 that permit the holder 79 in its downward movement, to continue through the trough after engaging a button, to advance the seized button into a position for its deposit on a tube part registered thereunder. The pistons of the pneumatic units 72 and 84 are normally maintained in their positions of rest, as shown, by fluid continuously supplied to their lower ends from a fluid supply line 150 through a pressure reducing valve 77. Owing to the weight of the moving parts of unit 72, a reduction in pressure effected by valve 77 and the differential characteristic, of the unit 84, such units are actuated to their alternative positions whenever fluid is supplied to their upper ends and to be restored to their positions of rest whenever their upper ends are connected to atmosphere. The branch of the fluid supply line 111 extending to the upper ends of such units, however, has included therein a normally closed magnetic valve 125 included in a circuit closed by a pair of contacts 126 actuated through the engagement of a roller 85 (Fig. 2) carried on a contact actuating arm 86, by a tube part such as 40 indexed at position 6.

As in the referred to prior machines, the indexing of turret 13 and the timing of the operations of the equipment at the respective intermediate positions are effected by means of like cam-actuated valves such, for example as the valve V shown in Figs. 5 and 6.

Valve V in its normal position blocks air supplied from line 150 to its intake pipe 131 from passage therethrough by means of a member 132 of a slide 133 normally held in the position shown by a spring 134. On the other hand, at this position a pipe 135 for connection with an end of a pneumatic unit, such as unit 123 for example, is connected to atmosphere via a passage 136 through slide 133 and a passage 137 of the valve housing. Slide 133 is moved downward, having reference to Fig. 6 when a cam, such for example as cam 140 (Fig. 5), depresses a roller 138 carried by a slide actuator pivoted at 139. With slide 133 in the latter position, a portion 141 of the valve housing blocks passage 136, while member 132 opens a passage in the valve between pipes 131 and 135, thus admitting operating air to the end of the unit to which pipe 135 is connected.

Referring to Fig. 5 it will be noted that the cam 140 for controlling the indexing operation, and the other similar cams for controlling the operations of the respective pneumatic units of the entire apparatus, are carried by a shaft 144 which is adapted to be continuously driven by a motor 31 through a worm drive 145. The indexing of turret 13 which as previously pointed out is driven by motor 30, is effected in a conventional manner under control of cam 140 through the medium of valve V, the pneumatic unit 123, and a single revolution clutch 124.

Coincident with the completion of each indexing operation a cam 141 of the timing equipment actuates valve V10 to place vacuum line 151 in communication with holder 79. In addition a cam 142 of the timing equipment momentarily actuates a valve V3 to supply air from line 150 to the right hand end of a four-way control valve 100 so that its spool 110 is moved to the left; thus as illustrated connecting a manifold 102, which is in communication with the front end of unit 62, to atmosphere through valve 100; while simultaneously directing fluid from the air supply line 150 through valve 100 to a manifold 101 with which the rear end of unit 62 is in communication via line 111. Unit 62 accordingly in known manner operates to advance the die 60 into a tube part indexed at position 5.

Moreover, according to the present invention, if a tube part such as 40 (Figs. 2 and 7) has been indexed at position 6, contacts 126 will have closed to effect the opening of valve 125. Under such circumstances operating fluid is fed from line 111 through valve 125 to the upper ends of units 84 and 72. Unit 84 is accordingly operated to separate one button from the series above it and to prepare it for the release of such a button upon subsequent restoration of the unit as will be more fully described later. Unit 72 is operated to advance the holder 79 into seizing relation with a previously released button 81 as illustrated in Fig. 7, and continues through the chute 80 to effect positioning of such button on a tube part, such as 40. An instant later timing cam 141 permits valve V10 to restore and thus disconnect the holder 79 from communication with the vacuum line 151 and to connect it to atmosphere, thus effecting deposit of the button on the tube part.

Following the usual perforating operation at position 5 the spool 110 of the four-way valve 100 is restored under control of the timing valve V4, thus effecting a reversal of the connections to manifolds 101 and 102 whereby the upper ends of unit 72 and 84 are connected to atmosphere via manifold 101. The pneumatic units 72 and 84 are thus enabled to restore under the influence of air continuously supplied to their lower ends. The unit 72 in restoring moves the holder 79 to its normal position of rest; and unit 84 restores the gate 83 to its initial position to release the button separated from the series above it upon the preceding operation of unit 84. As previously stated, advancement of the button is aided by air impinged against it from a suitable nozzle 91 arranged over trough 80. A needle valve 88, included in the branch of the air supply line extending to the lower end of unit 84, is suitably adjusted to introduce a sufficient delay in the restoration of unit 84 to assure that holder 79 is clear of the trough 80 and that trap doors 74 are in their restored positions before the delivery of a button to the lower end of the trough.

As will be appreciated, if at the time fluid is supplied to the manifold 101 there is no tube part at position 6, valve 125 will remain closed and accordingly units 72 and 84 will remain inactive.

Subsequent to the foregoing operations the cam 140 again functions to initiate a further indexing operation of turret 13.

What is claimed is:

1. In an element feeding apparatus, an element holder adapted for movement from a position of rest to an element delivery position, means for positioning an element for engagement by said holder during its movement toward the element delivery position, said means including a trough having its delivery end in the path of travel of said holder and having an associated displaceable element support pivoted for movement out of the path of travel of said holder by an element engaged thereby, a device for activating said holder to effect seizure of the engaged element by said holder whereby the holder is enabled to advance the element to a delivery position after the element has been passed through said displaceable element support, said device deactivating said holder after it has advanced the element to such delivery position.

2. In an element feeding apparatus, an element holder in the form of a vacuum chuck, means for moving said holder between a position of rest and an element delivery position, means for activating said holder for seizure of an element while traveling from its position of rest to its delivery position and for deactivating it before it leaves such delivery position, an element feeding trough having its delivery end arranged in the path of travel of said holder, element support means embodied in the delivery end of said trough and movable out of the path of travel of said holder by an element engaged thereby whereby an element resting on said support means may be seized and advanced through said trough to a delivery position.

3. In an element feeding apparatus such as defined by claim 2, a gate associated with said trough to effect the delivery of elements one at a time to said support means, and means for operating said gate to isolate an element from a group thereof arranged in said trough each time said holder leaves its position of rest and for restoring said gate to effect delivery of the isolated element to said support means while the holder is being returned to its position of rest.

References Cited in the file of this patent

UNITED STATES PATENTS

| | | |
|---|---|---|
| 856,972 | Marshall | June 11, 1907 |
| 2,308,188 | Madden | Jan. 12, 1943 |
| 2,361,176 | Carvey | Oct. 24, 1944 |
| 2,486,085 | Whitmore et al. | Oct. 25, 1949 |
| 2,637,942 | Hinkley | May 12, 1953 |
| 2,691,246 | Roeber | Oct. 12, 1954 |

FOREIGN PATENTS

| | | |
|---|---|---|
| 64,741 | Switzerland | June 19, 1913 |